United States Patent [19]

Aidlin et al.

[11] 4,225,375

[45] Sep. 30, 1980

[54] METHOD FOR MANUFACTURING FLAT-BOTTOMED PLASTIC BOTTLES

[76] Inventors: Samuel S. Aidlin, 214 Beaumont St., Brooklyn, N.Y. 11235; Stephen H. Aidlin, 934 Glenwood Rd., West Hempstead, N.Y. 11552

[21] Appl. No.: 958,525

[22] Filed: Nov. 7, 1978

Related U.S. Application Data

[62] Division of Ser. No. 855,799, Nov. 29, 1977, Pat. No. 4,132,584.

[51] Int. Cl.³ .................. B29B 5/00; B29C 17/00; B29F 1/10
[52] U.S. Cl. ............................ 156/242; 156/293; 156/285; 264/516
[58] Field of Search ............... 156/556, 566, 567, 578, 156/500, 242, 245, 293, 294, 285; 264/516, 513

[56] References Cited

U.S. PATENT DOCUMENTS

| | | | |
|---|---|---|---|
| 2,151,022 | 4/1973 | Mallory | 423/499 |
| 2,219,576 | 10/1940 | Moreland | 156/245 |
| 3,297,504 | 1/1967 | Brown | 156/556 |
| 3,651,190 | 3/1972 | Fritz | 264/235 |
| 3,726,429 | 4/1973 | Doughty | 215/1 C |
| 3,873,400 | 3/1975 | Tsuchida | 156/556 |
| 3,959,065 | 5/1976 | Ashcroft | 156/567 |

FOREIGN PATENT DOCUMENTS

2151022 4/1973 Fed. Rep. of Germany.
578413 6/1976 Switzerland.

*Primary Examiner*—Douglas J. Drummond
*Attorney, Agent, or Firm*—Karl F. Ross

[57] ABSTRACT

A machine for manufacturing plastic bottles by fitting round-bottomed hollow bodies of plastic material to flat-bottomed heels or base cups of similar material comprises a turntable forming a multiplicity of peripherally equispaced seats at a lower level and a like number of outwardly open radial recesses or pockets aligned therewith at an upper level. The hollow bodies are entrained by a conveyor from a blow-molding unit, in which they are produced, on a shelf which enters the turntable generally tangentially between the two levels and continues along a fraction of its periphery to a point just beyond a feeding station at which the separately produced heels are successively deposited on seats passing below the shelf. The hollow bodies, introduced by the conveyor into respective pockets above the shelf, then descend onto the underlying heels which are coated with a bonding agent such as a plastic melt. The body and its heel are held in firm contact, over another fractional revolution of the turntable, by a plunger preferably disposed thereabove; the resulting bottles are extracted further downstream by a stationary unloader.

4 Claims, 4 Drawing Figures

METHOD FOR MANUFACTURING FLAT-BOTTOMED PLASTIC BOTTLES

This is a division of application Ser. No. 855,799, filed Nov. 29, 1977, now U.S. Pat. No. 4,132,584.

FIELD OF THE INVENTION

Our present invention relates to a process for manufacturing plastic bottles for beverages, especially soft drinks, by fitting preshaped round-bottomed container bodies with complementary flat-bottomed heels or base cups of preferably the same resinous material.

BACKGROUND OF THE INVENTION

A known method of manufacturing plastic bottles of thermoplastic synthetic resins includes the blow-molding of thin-walled containers from heavier parisons. These containers are generally made with rounded undersides since attempts to blow-mold flat-bottomed hollow bodies have not given satisfactory results in terms of stability against deformation. It has therefore already been proposed to assemble such bottles from two complementary members, i.e. a blow-molded body and a separately molded base cup, firmly bonded to each other.

OBJECT OF THE INVENTION

The object of our present invention is to provide an efficient process for carrying out this assembly.

SUMMARY OF THE INVENTION

According to our present invention, plastic bottles with substantially flat undersides are produced by blow-molding a series of hollow plastic container member having round bottom surfaces, separately molding a series of flat-bottomed base members with concave upper surfaces which are substantially complementary to the aforementioned bottom surfaces, and simultaneously advancing these two series of container and base members over merging paths in synchronized steps whereby each container member encounters a respective base member at the merger point. The complementary surfaces of one series of members, preferably the upwardly facing base members, are adhesively coated on the approach of each such member to the merger point at which each container member and respective base member are interfitted with their complementary surfaces contacting each other, that contact being maintained during further advance of the members beyond the merger point. A machine for carrying out this process, as claimed in our parent application Ser. No. 855,799 (now U.S. Pat. No. 4,132,584), comprises a generally horizontally moving transporter provided with seats for the base members and with holders for the container members at a more elevated levels. The series of preshaped container members are carried by first conveyor means to a loading station adjacent the transporter for successive insertion into respective holders while the series of base members are concurrently carried by second conveyor means to a feeding station adjacent the transporter for successive deposition on respective seats in line with the inserted container members. The two series of complementary members may be produced in the same plant by a blow-molding unit and an injection-molding machine, yet they could also be prefabricated and brought on from respective storage facilities. A bonding agent, which may be a thermoplastic melt, is sprayed by an applicator on the concave upper surface of the cup-shaped base members or heels, traveling on the corresponding conveyor means toward the transporter. Upon proper emplacement of a base member and a container member on the transporter, with their complementary contact surfaces confronting each other, a clamping mechanism presses them together at these contact surfaces during hardening of the bonding agent. When the latter has substantially set, the finished workpiece is removed from the transporter by an extractor located at an unloading station, e.g. a stationary deflector. The transporter and the conveyors are preferably driven, continuously or in steps, by a common motor also synchronized with the clamping mechanism.

BRIEF DESCRIPTION OF THE DRAWING

The above and other features of our invention will now be described in detail with reference to the accompanying drawing in which.

SPECIFIC DESCRIPTION

Figure 1:
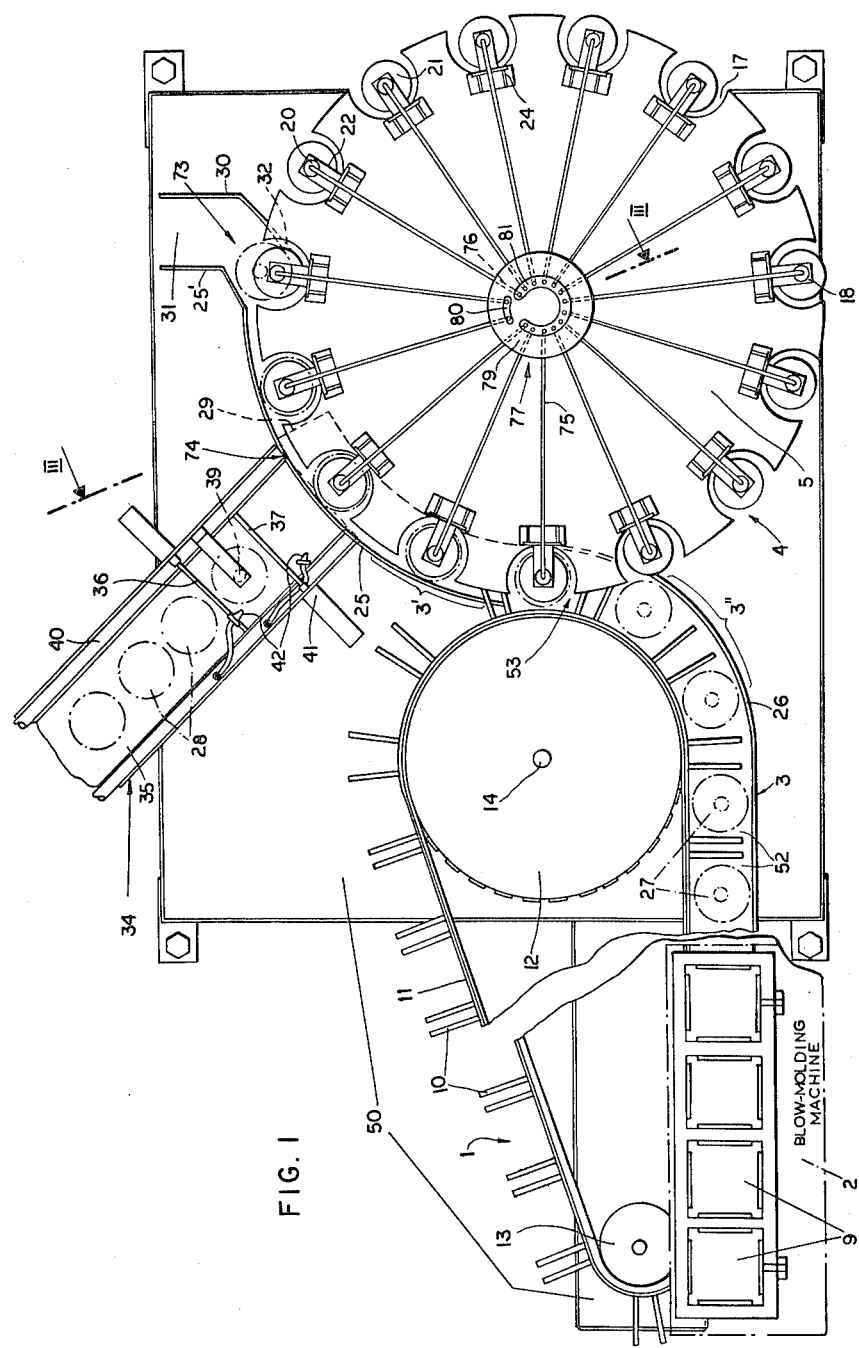
FIG. 1 is a top view of a bottle-making plant operating in conformity with our invention.
Figure 2:
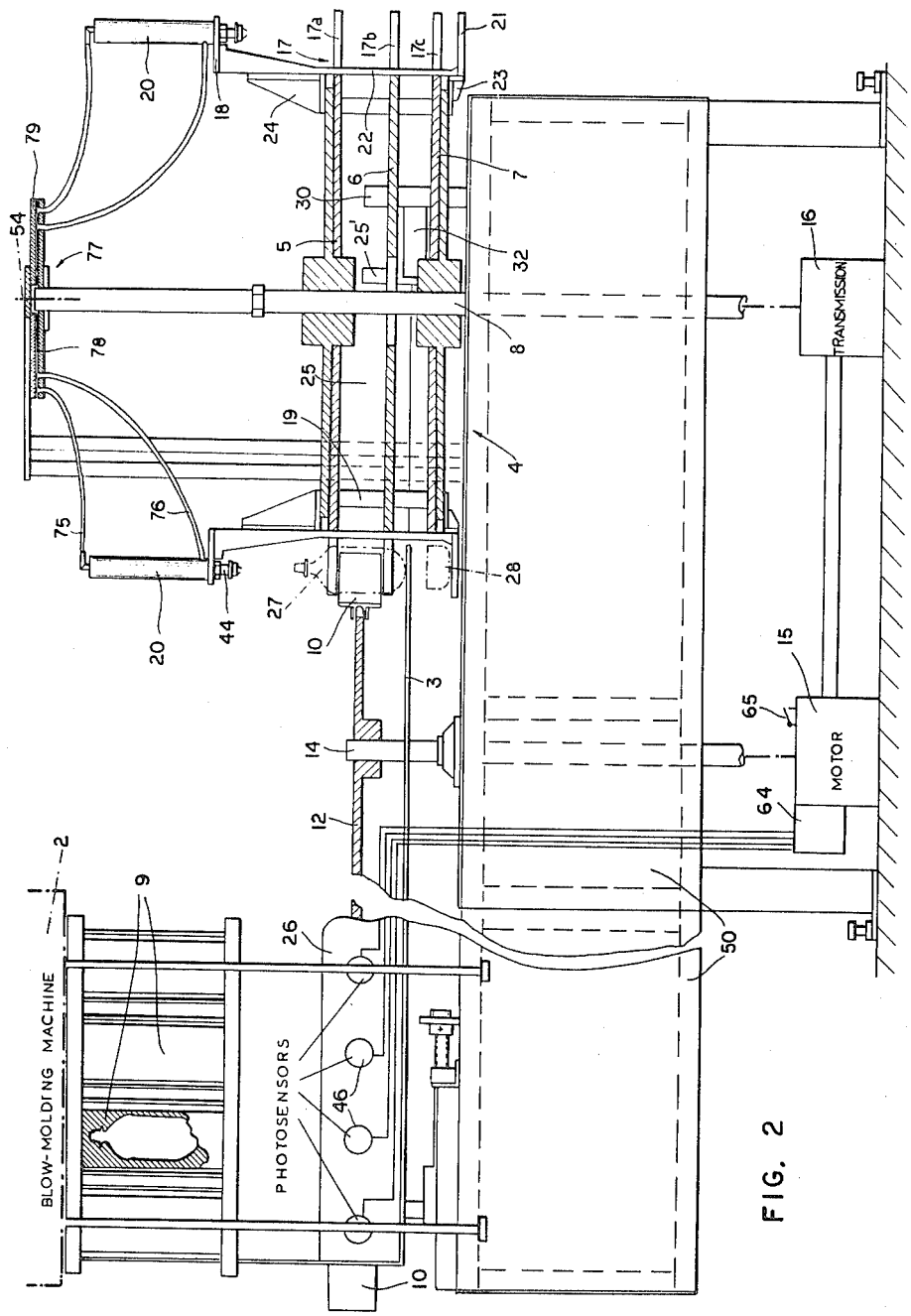
FIG. 2 is an elevational view of the plant illustrated in FIG. 1, with parts broken away.
Figure 3:
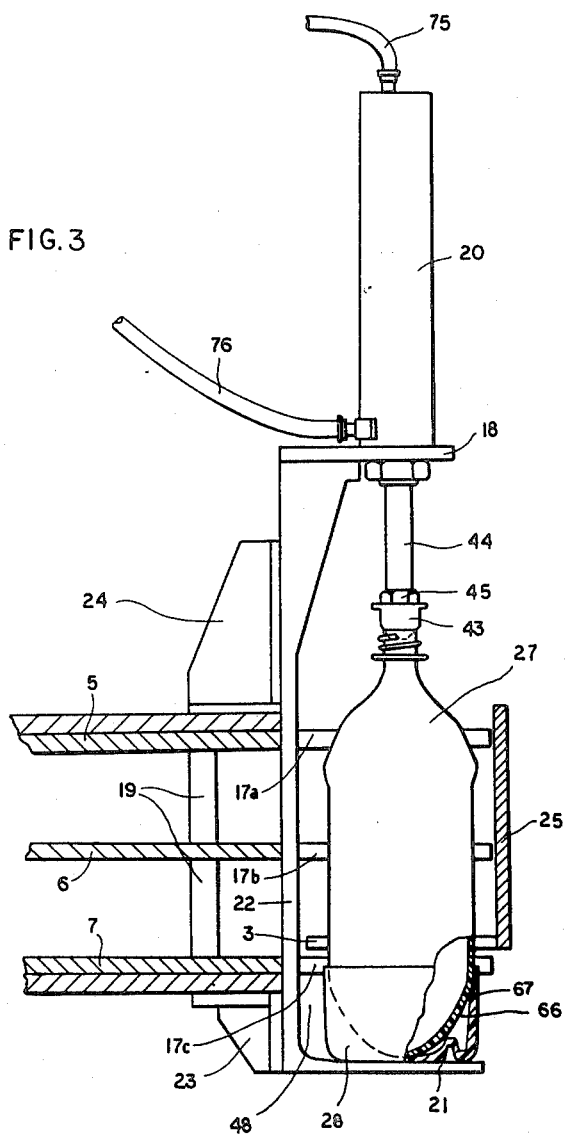
FIG. 3 is a cross-sectional view taken on the line III—III of FIG. 1 but drawn to a larger scale.

As illustrated in FIGS. 1 and 2, a plant for producing molded soft-drink bottles comprises a conveyor 1 for transporting thermoplastic container bodies from a blow-molding machine 2 to a turntable 4. The turntable includes three stacked circular disks 5, 6, 7 mounted for rotation about a vertical axis 54 on a shaft 8 which is journaled in a frame 50 and driven by a motor 15. The disks 5, 6, 7 are provided with fifteen peripherally equispaced sets of vertically aligned radial recesses 17a, 17b, 17c, the upper and intermediate recesses 17a, 17b forming fifteen generally semicylindrical outwardly and upwardly open pockets 17 for the reception of oncoming container bodies 27 carried from blow-molding unit 2 by conveyor 1. Each pocket 17 is overhung by a mounting 18 supporting a pneumatic cylinder 20 provided with a plunger 44. Mounting 18 is integral with an upright arm 22, attached to turntable 4 by a pair of brackets 23, 24, also forming a seat 21 framed by the lower recess 17c. Upright stays 19 juxtaposed with each pocket 17 serve to maintain the turntable disks 5–7 in vertical and angular alignment.

The thin-walled round-bottomed bodies 27 are shaped in the well-known manner, four at a time, in chambers 9 of blow-molding unit 2 suspended above frame 50. The four container members produced in each molding cycle are deposited on a generally S-shaped horizontal track 3 formed by a shelf rigid with frame 50, each container member being placed in a bay 52 defined by track 3 and a pair of vanes 10. In order to advance the molded container members 27 along track 3, the vanes 10 are attached to a cog belt 11 partly wound around two rotating sheaves 12 and 13; the larger sheave 12 is toothed for positive engagement with belt 11 and is driven by motor 15 via a vertical shaft 14 journaled in frame 50. The vanes 10 move at a level between the upper and middle tiers of recesses 17a, 17b, entering the annular gap between disks 5 and 6 at a loading station 53 to transfer the oncoming container bodies to the pockets 17 formed by these recesses from the bays 52 whose path at that point overlaps that of the pockets.

The rotation of the turntable by motor 15 via a transmission 16 is controlled by an array of photoelectric sensors disposed alongside the path of conveyor 1 in line with molding chambers 9 to monitor the discharge of successive sets of container bodies 27, four at a time, from machine 2. If blow-molding stops, or if less than four such bodies are produced in a molding cycle (which corresponds to a rotation of turntable 4 through four times the angular pitch of pockets 17, i.e. 96°, and an advance of conveyor 1 by many bays 52), sensors 46 operate a controller 64 to de-energize the motor 15. For this purpose, the sensors are periodically activated by a nonillustrated timer synchronized with the motor to detect light rays from radiation emitters across the conveyor 1 if no container bodies are interposed. Controller 64 may include a delay circuit designed to prevent the deactivation of motor 15 until the container bodies already molded have been fully processed. A hand-operated switch 65 may be used to override the sensors 46 and to restart the conveyor and turntable drive, with manual insertion of container bodies previously molded (or possibly coming from another source) into accessible bays 52. The S-shaped track 3 has an arcuate terminal segment 3' bounded on its convex side by an upstanding guardrail 25 serving to confine the container bodies 27 to their pockets 17. Track segment 3' ends in a radially oriented edge 29, rail 25 continuing beyond that edge along a peripheral sector of turntable 4 to an unloading station 73 where an extension 25' thereof bends radially away from the turntable opposite a stationary guide wall 30 defining therewith a discharge ramp 31. Wall 30 is provided with a deflecting finger 32 projecting between bottom disk 7 and middle disk 6 of the turntable to extract oncoming container bodies from pockets 17. Another segment 3" of track 3, partly curved in a sense opposite that of segment 3', has a vertical web 26 serving to guide the bodies 27 during their entrainment by conveyor 1.

Figure 4:
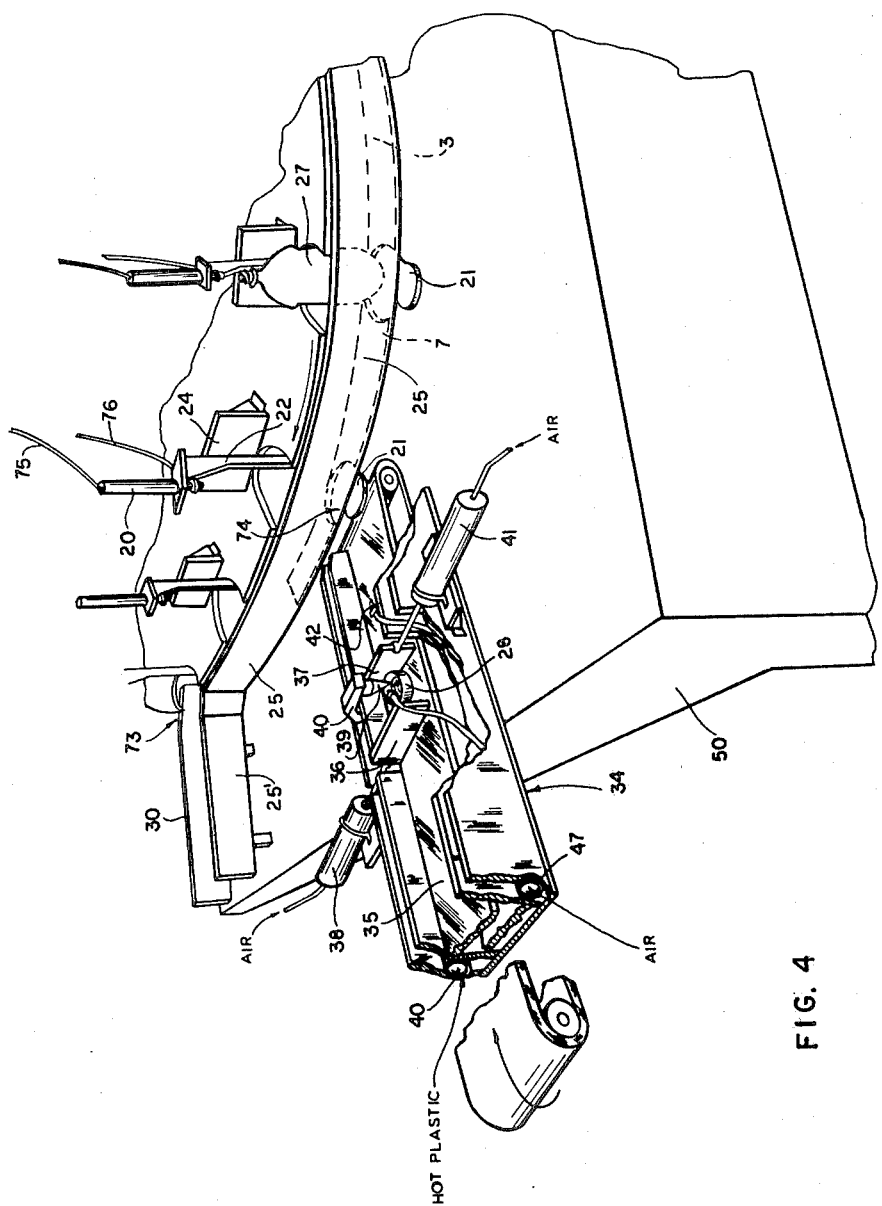
FIG. 4 is a perspective view of part of the plant shown in FIGS. 1 and 2.

In FIG. 4 we have shown a feeding station 74 at which substantially flat-bottomed base cups or heels 28, with concave upper contact surfaces 67 complementary to the rounded undersides 66 of bodies 27, are successively conveyed from a nonillustrated supply (e.g. an injection-molding machine synchronized with blow-molding machine 2) to turntable 4 by a chute 34 provided in its lower reach, approaching the turntable in a generally radial direction, with an endless belt 35. As a base cup 28 moves down this chute substantially at right angles to the container path, it passes a laterally retracted upstream barrier 36 and comes to rest against a downstream barrier 37 extended across the conveyor path, the two barriers being linked with respective pneumatic actuators 38, 41 under the control of the aforementioned timer. The drive of belt 35 includes a nonillustrated transmission powered by motor 15 so that this belt, too, comes to a halt when the motor is deactivated by the sensors 46.

Barrier 36, whose separation from barrier 37 barely exceeds the diameter of a base cup 28, interposes itself between the arrested cup and the following ones to prevent them from pressing against the former. Next, the timer actuates an applicator 39 poised above the confined cup to coat its upper surface with a liquid bonding agent supplied through a conduit 40, e.g. a melt adhesive. Thereafter, barrier 37 is withdrawn and a blast of air from several nozzles 42, connected to a conduit 47, propels the adhesive-coated cup forward onto a seat 21 then located at feeding station 73. As the turntable advances, a container body 27 held in a raised position in the associated pocket 17 by the stationary track extension 3' crosses the edge 29 and descends into contact with the cup, partly under its own weight and partly under pressure of a plunger 44 concurrently actuated by the overlying air cylinder 20. The two members 27, 28 remain under this air pressure as the adhesive between their contact surfaces hardens on the way to unloading station 73.

For operating the plungers 44 upon their arrival above edge 29, pressurized air is fed to each cylinder 20 by a respective pair of hoses 75, 76 connected at their infeed ends to a valve coupling 77 (FIGS. 1 and 2) comprising a rotating lower disk 78 on the shaft 8 of turntable 4 and a stationary upper disk 79 provided with two arcuate slots 80, 81 which communicate with an air compressor (not shown). Upon the clearing of edge 29 by a pocket 17, the associated upper hose 75 conducts pressurized air from the small slot 80 to the upper end of the respective cylinder 20, thus driving the plunger 43 downward. The plunger remains in this extended position until the associated pocket 17 reaches the unloading station 73, whereupon the lower hose 76 is pressurized by air from the large slot 81, thus retracting the plunger.

The synchronized drives for conveyor 1, turntable 4 and feeder belt 35 may operate continuously or intermittently, e.g. in steps corresponding to an advance of the turntable by one pocket (i.e. 24°).

The container bodies 27 may be blow-molded from polyethylene terephthalate, for example, which is impervious to gases and can therefore be used with carbonated beverages. The base cups 28, on the other hand, may consist simply of polyethylene.

We claim:

1. A process for producing plastic bottles with substantially flat undersides, comprising the steps of:
    blow-molding a series of hollow plastic container members having round bottom surfaces;
    separately molding a series of flat-bottomed base members with concave upper surfaces substantially complementary to said bottom surfaces;
    advancing said series of container members stepwise over an assigned path past a merger point while directing said series of base members toward a location close to said merger point;
    briefly arresting each base member at said location;
    adhesively coating each arrested base member at said location;
    propelling each coated base member with the aid of a jet of air to said merger point in timed relationship with the advance of said container members;
    interfitting each container member and a respective base member, meeting at said merger point, with their complementary surfaces contacting each other; and
    maintaining said contact during further advance of said members beyond said merger point.

2. A process as defined in claim 1 wherein said base members are propelled toward said merger point substantially perpendicularly to said path.

3. A process as defined in claim 1 wherein said container members are blow-molded from polyethylene terephthalate.

4. A process as defined in claim 1 wherein said base members are molded from polyethylene.

* * * * *